(12) United States Patent
Yu et al.

(10) Patent No.: US 8,207,086 B2
(45) Date of Patent: Jun. 26, 2012

(54) METHOD OF FABRICATING LAYERED NANO-CARBONATE USED FOR MEDIUM-HIGH TEMPERATURE $CO_2$ SORBENT

(75) Inventors: Ching-Tsung Yu, Taoyuan County (TW); Chi-Hung Wang, Changhua County (TW); Yau-Pin Chyou, Taoyuan County (TW)

(73) Assignee: Atomic Energy Council Institute of Nuclear Energy Research, Taoyuan (TW)

( * ) Notice: Subject to any disclaimer, the term of this patent is extended or adjusted under 35 U.S.C. 154(b) by 132 days.

(21) Appl. No.: 12/756,062

(22) Filed: Apr. 7, 2010

(65) Prior Publication Data

US 2011/0251056 A1    Oct. 13, 2011

(51) Int. Cl.
*B01J 20/22*     (2006.01)

(52) U.S. Cl. .................................................... 502/401
(58) Field of Classification Search ............... 423/420.2, 423/421, 441, 442; 502/401, 414, 415, 427
See application file for complete search history.

(56) References Cited

U.S. PATENT DOCUMENTS 6,749,825 B2 *   6/2004   Fryxell et al. .............. 423/419.1
* cited by examiner

*Primary Examiner* — Daniel C. McCracken
(74) *Attorney, Agent, or Firm* — Jackson IPG PLLC; Demian K. Jackson

(57) ABSTRACT

A technique of fabricating a medium-high temperature $CO_2$ sorbent of layered nano-carbonate is provided. A $CO_2$ sorbent is fabricated. The sorbent captures $CO_2$ at a medium-high temperature above 600° C. Calcium acetate is introduced for making a nano-scale layered double hydroxide (LDH). The layered structure is used for templated synthesis. The sorbent has an initial conversion rate above 90%; and the conversion rate remains the same even after 100 times of carbonation/de-carbonation cycles.

10 Claims, 6 Drawing Sheets

| Ca:Al | Ca% | CaO% |
|---|---|---|
| 1 : 1 | 34-36 | 48-50 |
| 3 : 1 | 38-40 | 53-56 |
| 5 : 1 | 43-46 | 60-64 |
| 7 : 1 | 47-49 | 66-70 |
| 13 : 1 | 49-51 | 69-71 |
| 20 : 1 | 50-55 | 70-77 |

FIG.3

| Ca:Al | $CO_2$ captured (%) |
|---|---|
| 1 : 1 | 13.4 |
| 3 : 1 | 31.3 |
| 5 : 1 | 43.2 |
| 7 : 1 | 51.6 |
| 13 : 1 | 61.2 |
| 20 : 1 | 66.9 |

FIG.4

| Recycled | Carbon captured ($W_n$, %) | Carbon left ($R_n$, %) |
|---|---|---|
| 0 | 51 | 100 |
| 10 | 50 | 98 |
| 40 | 49 | 96 |
| 60 | 48 | 94 |
| 80 | 47 | 92 |
| 100 | 46 | 90 |

FIG.6

METHOD OF FABRICATING LAYERED NANO-CARBONATE USED FOR MEDIUM-HIGH TEMPERATURE $CO_2$ SORBENT

TECHNICAL FIELD OF THE DISCLOSURE

The present disclosure relates to a $CO_2$ sorbent; more particularly, relates to introducing calcium acetate ($Ca(Ac)_2$) for fabricating a nano-scale layered double hydroxide (LDH) of $Ca(Ac)_2$—Al—$CO_3$, where layered structure of the LDH is used in templated synthesis to obtain a medium-high temperature $CO_2$ sorbent for capturing $CO_2$ at a temperature above 600° C.

DESCRIPTION OF THE RELATED ARTS

Calcium oxide (CaO) based material can be used for capturing $CO_2$ at a medium-high temperature above 600° C. Because the long-term durability through regeneration cycles is a crucible feature of solid sorbent for capturing $CO_2$, reaction temperature of $CO_2$ and metal oxide as well as regeneration temperature of the metal carbonate become essential. Among a few metal oxides, CaO has the feature of both the $CO_2$ reaction temperature and the decomposition temperature of metal carbonate located between 600° C. and 800° C., which is a good sorbent applied for high-temperature conditions. Calcium-based oxides can be divided into two categories: raw material and immobilized material. The former means those containing alkaline metals like limestone, calcite and artificial pretreated CaO. The later means those synthesized with powders or structural materials of alkaline metal oxide like zeolite with high surface area modified with calcium (Ca)- or magnesium (Mg)-oxide. CaO has a high $CO_2$ conversion rate because the carbonation product of calcium carbonate ($CaCO_3$) is a thermodynamically stable material. However, some reactions between CaO and $CO_2$ are irreversible. Besides, $CaCO_3$ may easily be sintered and porous structure may thus be destroyed. Usually, surface area and pore volume of CaO are increased to reduce in regeneration cycles. Hence, for increasing surface area, radiuses of the raw materials are minimized or materials are immobilized on a high surface support.

Some methods for size control are revealed, like precipitating $CaCO_3$, wet-impregnating calcium ions ($Ca^{+2}$) on silicon dioxide ($SiO_2$) or synthesizing a composite material of CaO—$Al_2O_3$. Or, Organic additive can also be used to enhance synthesizing colloid solution containing $Ca^{+2}$. Another solution is to apply nano $Ca^{+2}$ gel on porous material of polymethylmethacrylate (PMMA). In recent researches, co-precipitation is used. Magnesium ions ($Mg^{+2}$) in a structural material of layered double hydroxides (LDH) are replaced with calcium ions ($Ca^{+2}$) to obtain a template for making powders or films with nano CaO structures. This kind of materials can be used to capture $CO_2$ or other selected gas above 400° C. Yet, the above prior arts do not introduce $Ca(Ac)_2$ for templated synthesis with layered structure in obtaining Ca/Al(aluminum) carbonate for capturing $CO_2$ at a temperature above 600° C. Hence, the prior arts do not fulfill all users' requests on actual use.

SUMMARY OF THE DISCLOSURE

The main purpose of the present disclosure is to fabricate a synthesized nano-scale layered composite material of $Ca(Ac)_2$—Al—$CO_3$ having dense pores.

The second purpose of the present disclosure is to provide a nano-scale LDH of $Ca(Ac)_2$—Al—$CO_3$ with $Ca(Ac)_2$ introduced, where the layered structure is used for templated synthesis to obtain a sorbent for capturing $CO_2$ above 600° C.

To achieve the above purposes, the present disclosure is a method of fabricating a medium-high temperature $CO_2$ sorbent of layered nano-carbonate, comprising steps of: (a) obtaining reactants of $Ca(Ac)_2$, aluminum nitrate ($Al(NO_3)_3$) and sodium carbonate ($Na_2CO_3$) to process a reaction with sodium hydroxide (NaOH) added to control alkalinity; (b) obtaining a layered material of calcium/aluminum (Ca/Al) carbonate after the reaction; (c) calcining to remove anions and acetate in the layered material; and (d) synthesizing a nano-scale layered composite material of the Ca/Al carbonate ($Ca(Ac)_2$—Al—$CO_3$). Accordingly, a novel method of fabricating a medium-high-temperature $CO_2$ sorbent of layered nano-carbonate is obtained.

BRIEF DESCRIPTION OF THE DRAWINGS

The present disclosure will be better understood from the following detailed description of the preferred embodiment according to the present disclosure, taken in conjunction with the accompanying drawings, in which

FIG. 3 illustrates a table showing the ratios of Ca and CaO in the $Ca(Ac)_2$—Al—$CO_3$;

FIG. 4 illustrates a table showing the $CO_2$ absorption of the $Ca(Ac)_2$—Al—$CO_3$;

FIG. 6 illustrates a table showing the $CO_2$ conversion rates for 100 times cycles.

DESCRIPTION OF THE PREFERRED EMBODIMENT

The following description of the preferred embodiment is provided to understand the features and the structures of the present disclosure.

Figure 1:
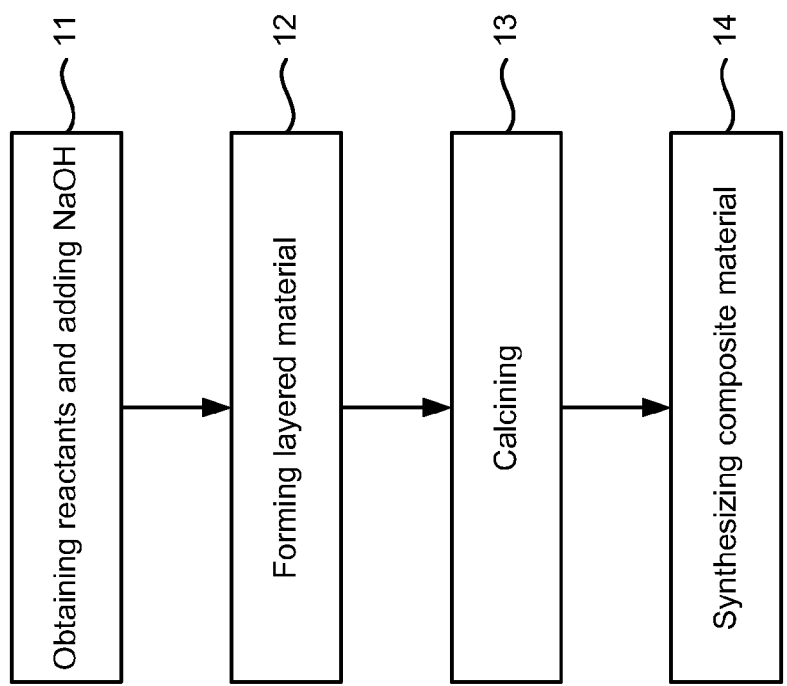
FIG. 1 illustrates a flow chart showing a preferred embodiment according to the present disclosure.
Figure 2:
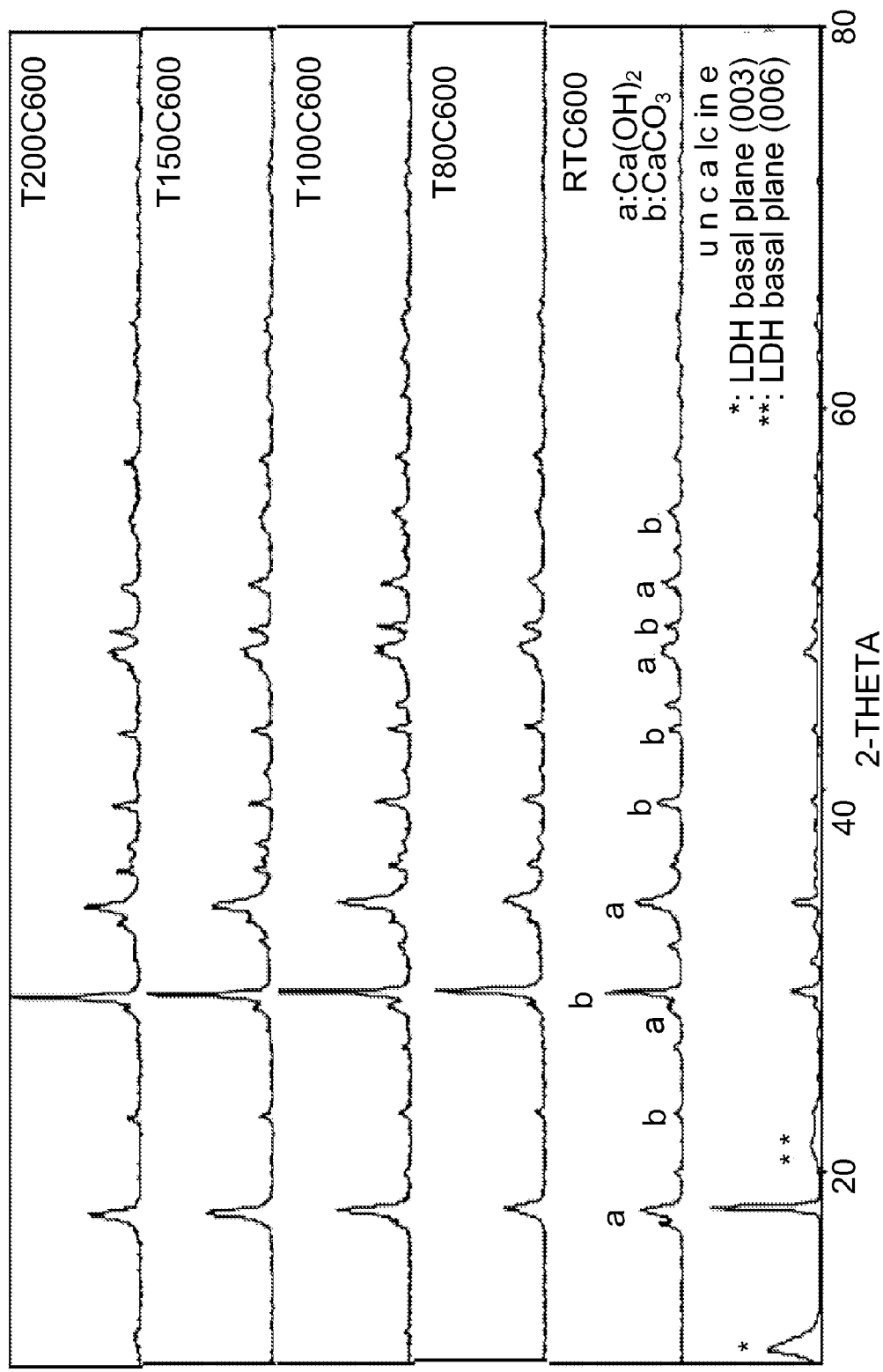
FIG. 2 illustrates an XRD pattern showing the $Ca(Ac)_2$—Al—$CO_3$ before being calcined.

Please refer to FIG. 1 to FIG. 3 in which FIG. 1 illustrates a flow chart showing a preferred embodiment according to the present disclosure; FIG. 2 illustrates an XRD pattern showing $Ca(Ac)_2$—Al—$CO_3$ before and after being calcined; and FIG. 3 illustrates a table showing ratios of Ca and CaO in the $Ca(Ac)_2$—Al—$CO_3$. As shown in the figures, the present disclosure is a method of fabricating a medium-high-temperature $CO_2$ sorbent of layered nano-carbonate, comprising:

(a) obtaining reactants and adding NaOH 11: Calcium acetate ($Ca(Ac)_2$), aluminum nitrate ($Al(NO_3)_3$) and sodium carbonate ($Na_2CO_3$) are obtained as reactants to process a reaction and sodium hydroxide (NaOH) is added to control alkalinity, (b) forming layered material 12: A layered material of calcium/aluminum (Ca/Al) carbonate is formed after the reaction, where the layered material of Ca/Al carbonate is a layered double hydroxide (LDH) comprising two cations and anions. Thus, a template is obtained with a layer of oxide formed by cations of Ca and Al and with layers containing carbonate ($CO_3^{2-}$) and hydroxide ($OH^-$), (c) calcining 13: Anions and acetates in layers are removed by calcining while the ratio of Ca to Al is changeable, and (d) synthesizing composite material 14: Thus, a nano-scale layered composite material having Ca/Al carbonate is synthesized.

Therein, the LDH is synthesized through calcining to form a Ca—Al oxide solid solution containing micro-crystals of $Ca(OH)_2$ and $CaCO_3$. When the ratio of Ca:Al is 7:1, the $Ca(Ac)_2$—Al—$CO_3$ is synthesized with a pore volume of 0.019 cc/g. The $Ca(Ac)_2$—Al—$CO_3$ has micro-/mesopores with an average radius between 2 and 6 nanometers (nm). The $Ca(Ac)_2$—Al—$CO_3$ has an initial conversion above 90% and remains the 90% conversion rate even after many times of carbonation/de-carbonation cycles.

Amount of calcium oxide (CaO) in the $Ca(Ac)_2$—Al—$CO_3$ is important to carbon dioxide ($CO_2$) absorption. In FIG. 3, when the ratio of Ca:Al is a value of 1~5 or 7~20, CaO contained in the $Ca(Ac)_2$—Al—$CO_3$ is 48~64% or 66~77%, which is calculated by Ca % determined by inductively coupled plasma (ICP) spectroscopy.

Figure 5:
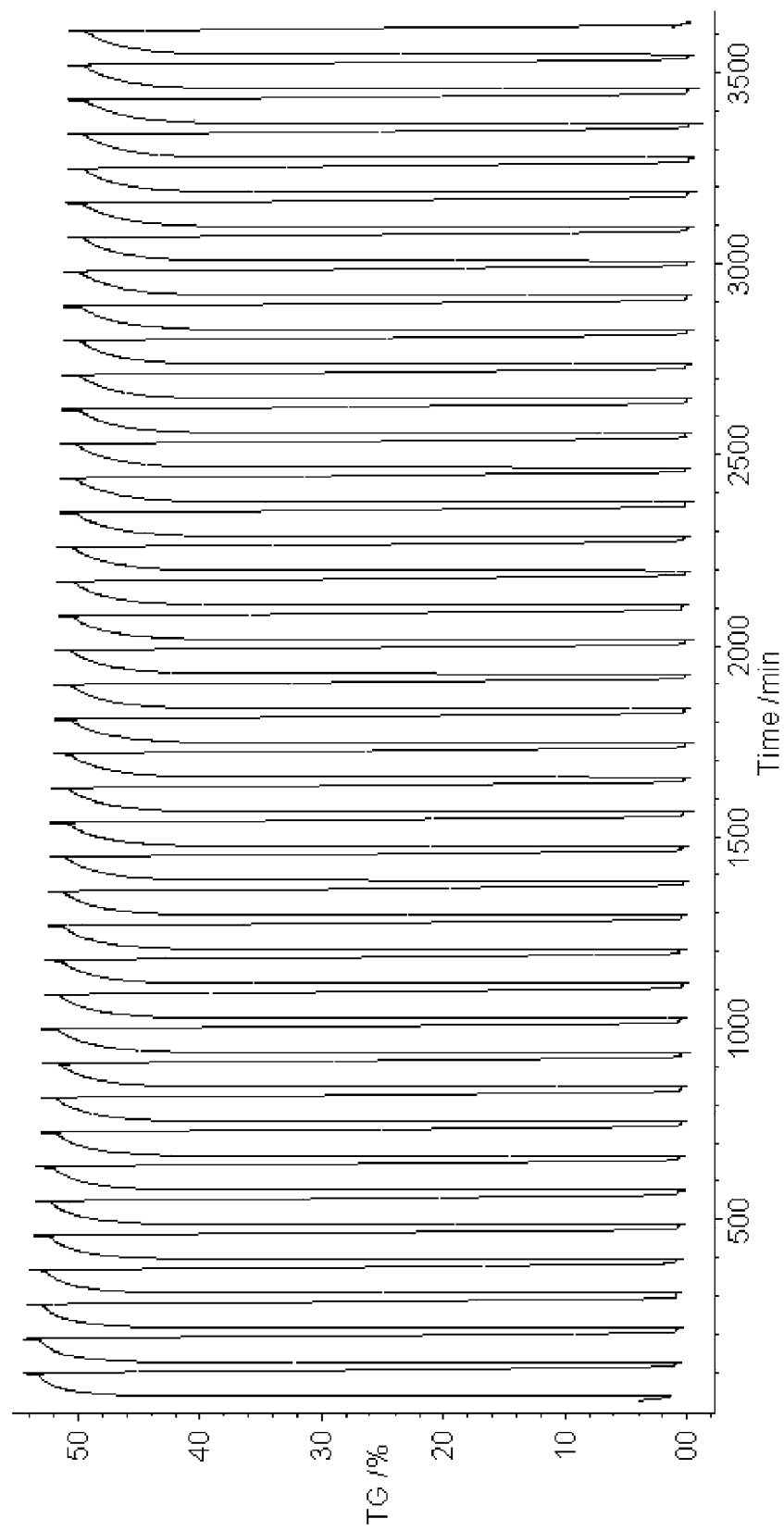
FIG. 5 illustrates a chart showing the $CO_2$ conversion rates for 40 times cycles.

Please refer to FIG. 4 to FIG. 6, in which FIG. 4 illustrates a table showing a $CO_2$ absorption of $Ca(Ac)_2$—Al—$CO_3$; FIG. 5 illustrates a chart showing $CO_2$ conversion for 40 cycles; and FIG. 6 illustrates a table showing $CO_2$ conversion for 100 cycles. As shown in the figures, on using the present disclosure, a synthesized $Ca(Ac)_2$—Al—$CO_3$ captures $CO_2$ at a high temperature between 400° C. and 800° C. with an initial conversion rate higher than 96% while the conversion still remains high even after many times of carbonation/de-carbonation cycles. In FIG. 4, the $Ca(Ac)_2$—Al—$CO_3$ captures greater amounts of $CO_2$ with a higher Ca:Al ratio at 750° C. When the ratio is 1~20, the amount of captured $CO_2$ is 13.4~66.9%. But, when the ratio of Ca:Al is higher than 7, crystalline phase of the synthesized material may become complex and cost may become high. In FIG. 5, a $CO_2$ conversion after 40 times of cycles at 750° C. is 95%. In FIG. 6, a $CO_2$ conversion rate after 100 times of cycles at 750° C. still remains 90% (remains 65% even after 200 times of conversion, not shown in the figure). After 100 times of $CO_2$ capturing cycles at 750° C. through $Ca(Ac)_2$—Al—$CO_3$, 47 times amount of $CO_2$ based on using sorbent weight is captured.

Thus, the present disclosure introduces $Ca(Ac)_2$ for fabricating a nano-scale LDH of $Ca(Ac)_2$—Al—$CO_3$, where the layered structure is used for templated synthesis to obtain a medium-high temperature $CO_2$ sorbent for capturing $CO_2$ above 600° C. with an initial conversion above 90%, which conversion remains the same even after 100 times of conversion.

To sum up, the present disclosure is a method of fabricating a medium-high-temperature $CO_2$ sorbent of layered nano-carbonate, where $Ca(Ac)_2$ is introduced for fabricating a nano-scale LDH of $Ca(Ac)_2$—Al—$CO_3$; and the layered structure is used for templated synthesis to obtain a medium-high temperature $CO_2$ sorbent for capturing $CO_2$ above 600° C. with an initial conversion rate above 90%, which conversion rate remains the same even after 100 times of conversion.

The preferred embodiment herein disclosed is not intended to unnecessarily limit the scope of the disclosure. Therefore, simple modifications or variations belonging to the equivalent of the scope of the claims and the instructions disclosed herein for a patent are all within the scope of the present disclosure.

What is claimed is:

1. A method of fabricating a medium-high temperature $CO_2$ sorbent of layered nano-carbonate, the method comprising:

obtaining reactants of calcium acetate ($Ca(Ac)_2$), aluminum nitrate ($Al(NO_3)_3$), and sodium carbonate ($Na_2CO_3$) to process a reaction with sodium hydroxide (NaOH) which is added to control alkalinity;

obtaining a layered material of calcium/aluminum (Ca/Al) carbonate after said reaction;

calcining to remove anions and acetate in said layered material;

synthesizing a nano-scale layered composite material of said Ca/Al carbonate ($Ca(Ac)_2$—Al—$CO_3$), wherein said layered material is a layered double hydroxides (LDH) comprising two cations and two anions, said cations comprising Ca and Al;

wherein a layer of oxide octahedron is obtained with said cations;

wherein said layered material has layers containing carbonate ($CO_3^{2-}$) and hydroxide ($OH^-$);

wherein said octahedron is used as a template to remove said anions and said acetate based at least in part on the calcining;

wherein said $Ca(Ac)_2$—Al—$CO_3$ has micro-/mesopores;

wherein each of said pores has a radius between 2 and 6 nanometers (nm); and fabricating the nano-scale layered composite material to capture carbon dioxide ($CO_2$).

2. The method according to claim 1, wherein said $Ca(Ac)_2$—Al—$CO_3$ has a ratio of Ca to Al (Ca:Al) between 1 and 5.

3. The method according to claim 2, wherein said $Ca(Ac)_2$—Al—$CO_3$ has a ratio of calcium oxide (CaO) between 48% and 64%.

4. The method according to claim 1, wherein said $Ca(Ac)_2$—Al—$CO_3$ has a ratio of Ca:Al between 7 and 20.

5. The method according to claim 4, wherein said $Ca(Ac)_2$—Al—$CO_3$ has a ratio of CaO between 66% and 77%.

6. The method according to claim 1, wherein said $Ca(Ac)_2$—Al—$CO_3$ has a pore volume of 0.019 cc/g when being synthesized with a 7:1 ratio of Ca:Al.

7. The method according to claim 1, wherein said $Ca(Ac)_2$—Al—$CO_3$ captures said carbon dioxide ($CO_2$) at a temperature between 400° C. and 800° C. with a 96% initial conversion rate.

8. The method according to claim 1, wherein said $Ca(Ac)_2$—Al—$CO_3$ captures 47 times of used sorbent weights of $CO_2$ after 100 times of carbonation/de-carbonation cycles.

9. The method according to claim 1, wherein said $Ca(Ac)_2$—Al—$CO_3$ has an initial conversion rate of $CO_2$ above 90%.

10. The method according to claim 1, wherein said $Ca(Ac)_2$—Al—$CO_3$ has a conversion rate of $CO_2$ above 90% after 100 times of carbonation/de-carbonation cycles.

* * * * *